Patented Feb. 6, 1951

2,540,596

UNITED STATES PATENT OFFICE 2,540,596

CHLOROPRENE POLYMER VULCANIZATES
AND METHOD FOR PREPARING SAME

John Rehner, Jr., Westfield, N. J., and Paul J. Flory, Kent, Ohio, assignors to Standard Oil Development Company, a corporation of Delaware No Drawing. Application November 8, 1945, Serial No. 627,536

8 Claims. (Cl. 260—92.3)

This invention relates to polymers of chloroprene; relates particularly to methods for curing such polymers; and relates especially to the vulcanization of polychloroprene by aromatic dinitroso compounds.

This application is a continuation in part of our co-pending application Serial No. 471,372, filed January 5, 1943, for Chemical Process and Product, now abandoned, and of Serial No. 507,188, filed October 21, 1943, for Chemical Process, now abandoned.

The polymerization of chloroprene by such processes as emulsion polymerization in the presence of a soap and a polymerization catalyst; or by a mass polymerization with or without a catalyst; or by other methods, yields a high molecular weight polymer having many of the physical properties of caoutchouc. However, this polymer appears to be almost, if not wholly, non-reactive with sulfur either as such or in the presence of the vulcanization accelerators used with rubber. A suitable heat treatment will improve the properties of the polymer and heating the polychloroprene in the presence of zinc oxide or magnesium oxide or the like yields an improvement in physical properties analogous to that obtained by vulcanization. While these treatments yield improvements in physical properties of the polymer such as increased strength, the reactions are not wholly satisfactory for all applications.

According to the present invention it is now found that the aromatic dinitroso compounds broadly will vulcanize polychloroprene in a true vulcanization reaction to yield a definite and satisfactory elastic limit, an excellent tensile strength, a good rebound, and the removal of substantially all traces of cold flow and plasticity. Also this improvement not only is greater than by any previous known method but it is obtained in a much shorter time than by any previous process. Thus in the process of the invention there is mixed into polychloroprene an aromatic dinitroso compound such as para- or meta-dinitroso benzene or para- or meta-dinitroso cymene or a dinitroso naphthalene or the like (there are no ortho dinitroso compounds, they rearrange into furoxanes). For the purposes of this invention any para- or meta-dinitroso aromatic compound is more or less useful, it being only necessary that the compound contain at least one aromatic ring nucleus having two dinitroso substituents on it. It is preferable that these two dinitroso substituents be in para position with respect to each other, although other positions are not excluded, and other substituents are not excluded. The preferred other substituents are hydrocarbon radicals, but as far as is now known there are no limitations on the character of the substituent, which may be inorganic or organic in nature and may be acid or alkaline. According to the process of the invention, the mixture is then heated to cause a chemical union or vulcanization of the polymer by the dinitroso compound to yield a dinitroso cured polychloroprene of good tensile strength, excellent elongation, extremely low solubility in many kinds of solvents; and many other valuable properties. Other objects and details of the invention will be apparent from the following description:

The principal raw material of the present invention is polychloroprene. This is conveniently prepared from chloroprene having the formula

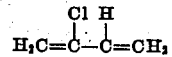

which in turn may be prepared by well known processes from acetylene and hydrogen chloride. Broadly, the method of preparation consists in the steps of treating acetylene with cuprous chloride to yield vinyl acetylene; which in turn is treated with aqueous hydrogen chloride to yield the chloroprene according to the formula above given.

The resulting chloroprene is then emulsified in water by the aid of a soap and is polymerized in water solution into a latex. This polymerization will proceed without aid, but it is somewhat slow and, accordingly, in the commercial manufacture, a polymerization catalyst is usually added. For this purpose the preferred catalysts are the peroxide types such as hydrogen peroxide, sodium peroxide or potassium peroxide. The resulting polymer shows a valuable type of insolubility. It is wholly insoluble in water and aqueous solutions of all kinds including acids, bases and salts. It is relatively insoluble in the aliphatic hydrocarbons generally, and is insoluble and non-reactive with most organic compounds. It shows some solubility in the aromatic compounds such as benzene, toluene, xylene, and also in the halogenated, particularly the chlorinated, type of hydrocarbons; as well as in some of the naphthenic base petroleum fractions.

According to the present invention, this material, after polymerization, coagulation and washing on the mill to remove as much as possible of the soap and polymerization catalyst, and drying, is compounded with the desired dinitroso compound and, in addition, with such other fillers and improving agents as may be desired. A convenient simple compounding recipe is shown in the following Recipe I:

Recipe I

| | Parts |
|---|---|
| Polymer | 100 |
| Stearic acid | 1 to 10 |
| Carbon black | 10 to 100 |
| Dinitroso compound | 0.1 to 10 |

In the preparation of this compound, the stearic acid and carbon black are preferably added first and well milled in, cutting the compound back and forth across the face of the mill. The dinitroso compound is preferably added last, and milled in as quickly as possible at as low a temperature as convenient. This compound is then ready for curing and it may be cured immediately or may be stored in a cool location for substantial periods of time up to several weeks and then cured.

The compound may be calendered onto fabric or may be sheeted out or extruded or otherwise shaped or molded.

Alternatively, the latex may be used without coagulation; the necessary compounding agents including stearic acid, the carbon black and the dinitroso compound being added to the latex, either as finely divided dry ingredients, or as aqueous dispersions, well stirred in, and the latex utilized in the customary manner such as by dipping forms into the latex and coagulating the polymer from the latex on the form, dipping and coagulating being continued until the desired thickness is obtained, or the latex may be precipitated upon a suitable form by electrophoresis; or the latex with the addition agents may be coagulated by acid, electrolytes, or otherwise and the coagulate separated and used directly.

When the compound has been properly shaped, it is cured by heating to a temperature preferably within the range between 150° F. to 300° F. for time intervals ranging from a few minutes to several hours, depending upon the character of the polymer or latex, the amount of curing agent, the amount of fillers and addition agents and the tightness of cure desired.

The resulting cured polymer will show a tensile strength within the range from about 1000 pounds per square inch to 4000–4500 pounds per square inch, depending upon the tightness of cure, the amount of reinforcing carbon black, the amount of curing agent and similar factors.

Thus the compounded and cured material is of high strength and shows a very desirable insolubility in liquids of many kinds.

EXAMPLE 1

A sample of polychloroprene identified in the trade as "Neoprene GN 100" was compounded according to the following Recipe II:

Recipe II

| | Parts |
|---|---|
| Neoprene GN 100 | 100 |
| Stearic acid | 1 |
| Zinc oxide | 1 |
| Channel carbon black | 60 |
| Para dinitroso benzene | 1 |

The batch was prepared on a cool open roll mill as above described, the polymer being put on the mill first and milled to a suitably plastic state, requiring a time of approximately 10 minutes. The stearic acid, zinc oxide and carbon black were then milled in, care being taken that a good homogeneous dispersion was obtained. The para dinitroso benzene was milled in last and milled sufficiently to obtain a good dispersion.

The finished compound was then shaped and press cured; three separate portions being separately cured for 15, 30 and 60 minutes. Test specimens were cut from the cured material and the tensile strength and elongation determined to yield the following inspection record:

TABLE I

| Cure at 142° C., minutes | 15 | 30 | 60 |
|---|---|---|---|
| Tensile strength, p. s. i. | 3,450 | 3,380 | 2,950 |
| Ultimate elongation, per cent | 255 | 285 | 200 |

It will be noted that the maximum tensile strength was attained at some time of cure less than 15 minutes, and this would be considered a fast cure for Neoprene GN, especially at the curing temperature and with the compound employed here. This fact, together with the observation, made at the time the above mix was prepared, that the neoprene readily "scorches" on addition of the vulcanizing agent on a warm mill indicates that active vulcanization could be effected at even lower temperatures within practicable periods of time by using this vulcanizing agent.

The above Recipe II contains 1% of zinc oxide, to improve the processing.

EXAMPLE 2

A second mixture was prepared according to the following Recipe III:

Recipe III

| | Parts |
|---|---|
| Neoprene GN 100 | 100 |
| Stearic acid | 1 |
| Channel carbon black | 60 |
| Para dinitroso benzene | 1 |

This mixture was prepared on the roll mill, as above outlined, and three portions were then separately cured at 142° C. for 15, 30 and 60 minutes, whereafter test samples cut from the cured portions were tested for tensile strength, elongation at break and modulus to yield the inspection record of Table II.

TABLE II

| Cure at 142° C., minutes | 15 | 30 | 60 |
|---|---|---|---|
| Tensile strength, p. s. i. | 2,575 | 2,815 | 2,740 |
| Modulus at 300% elongation, p. s. i. | 1,880 | 2,605 | ---- |
| Elongation, percent | 445 | 325 | 275 |

These results show the excellent tensile strength and rapid cure of the polychloroprene in the absence of zinc oxide.

EXAMPLE 3

It is not necessary that the solid coagulated polychloroprene be used, but the latex as received from the polymerizers may be used directly.

A series of 3 compounds were prepared utilizing the polychloroprene latex sold in the trade as "Neoprene Latex 571" according to the following Recipe IV. The various compounding ingredients were added as aqueous dispersions, the amounts given in Recipe IV being on a dry basis.

Recipe IV

|  | A | B | C |
|---|---|---|---|
| Neoprene (Latex 571) | 100 | 100 | 100 |
| Agerite white (di-betanaphthyl-para-phenylenediamine) | 1.5 | 1.5 | 1.5 |
| p-Dinitrosobenzene | 0.5 | 0.5 | 2 |
| Zinc oxide |  | 5 |  |
| Ammonium alginate | 0.1 | 0.1 | 0.1 |

Films were deposited from this latex on suitable forms and these films or thin sheets were then cured for various times at various temperatures and were then tested for tensile strength, elongation at break, and modulus to yield the inspection record shown in the following Table III.

TABLE III

| Vulcanized for— | A | B | C |
|---|---|---|---|
| 30' at 158° C | 1225—1066 / 181—300 | 1272—1120 / 147—246 | 1491—1073 / 215—310 |
| 60' at 158° C | 1606—1160 / 194—301 | 1361—1140 / 147—246 | 1820—1023 / 232—406 |
| 90' at 158° C | 1703—1133 / 179—286 | 1433—1106 / 155—346 | 1996—1026 / 233—406 |
| 30' at 212° F | 1973—1076 / 190—308 | 2310—1060 / 184—253 | 2210—1010 / 254—394 |
| 60' at 212° F | 2160—1150 / 202—313 | 2796—986 / 228—279 | 2270—1040 / 263—464 |
| 90' at 212° F | 2303—1050 / 205—330 | 2855—813 / 271—441 | 2380—1053 / 258—431 |
| 30' at 287° F | 3030—1023 / 220—357 | 1842—1100 / 206—277 | 3583—970 / 234—507 |
| 60' at 287° F | 3460—960 / 184—333 | 2023—1086 / 190—285 | 4060—905 / 294—677 |
| 90' at 287° F | 3796—900 / 196—306 | 2162—1100 / 187—238 | 3766—830 / 352—830 |

EXAMPLE 4

A compound was prepared similar to that in Recipe III but including 20 parts (per 100 parts of polychloroprene) of polyisobutylene having a molecular weight of approximately 90,000. This material was found to cure in the same way as the mixture of Example 2 and to show nearly the same tensile strength, with a substantially increased elongation and slightly higher modulus.

EXAMPLE 5

A similar mixture was prepared, using the recipe of Example 2, with 100 parts (per 100 parts of polychloroprene) of simple polyisobutylene having a molecular weight of approximately 90,000. In this instance also the material cured quickly and satisfactorily. The tensile strength was somewhat reduced, but the modulus and elongation at break were very substantially increased, resulting in a compound having valuable properties. It may be noted that the addition of simple polyisobutylene does not affect the insolubility of the vulcanized compound in aqueous liquids of any sort, but the solubility and swelling in hydrocarbon liquids are markedly modified; the swell being greatly increased and a substantial amount of extractives being obtained after treatment with light naphtha.

EXAMPLE 6

It may be noted that the speed of cure of polychloroprene by dinitroso compounds is not greatly different from the speed of cure of the butadiene copolymers such as the copolymer of butadiene with styrene and the copolymer of butadiene with acrylonitrile.

Recipes similar to the recipe in Example 2 were prepared, to which there was added, in addition, varying amounts of the copolymer of butadiene with styrene known as Buna-S. The two polymers mixed together readily and yielded an excellent raw compound which was found to cure promptly and easily into a material of excellent strength, good modulus and satisfactory elongation at break. In this compound also the modulus and elongation at break could be substantially improved by the addition of varying amounts of simple polyisobutylene, although a reduction in insolubility in hydrocarbon solvents was noted.

EXAMPLE 7

A similar mixture was prepared according to the recipe in Example 2, to which there were added varying amounts of the copolymer of butadiene with acrylonitrile, known to the trade as "Perbunan." This mixture was less readily prepared and the compounds were much more difficult to work into a homogeneous dispersion but the resulting cured material was satisfactory for many purposes.

EXAMPLE 8

Similar curing tests with natural rubber yielded analogous results, although in this instance compounding was somewhat more difficult.

EXAMPLE 9

A similar recipe to that in Example 2 was prepared, to which was added a polymer prepared by the copolymerization of a major proportion of butadiene with a minor proportion of diisobutylene, particularly a compound in the ratio of 60 to 40. This material after curing yielded a markedly stiffer, harder compound than the polychloroprene alone, although the resulting product was not brittle in the way in which hard rubber or "bakelite" are brittle. It was found possible by adjustment of the amount of the diisobutylene copolymer to adjust the hardness of the compound; small amounts of the second copolymer yielding only a little hardening, while larger amounts yielded a material which tended to be leathery in character or relatively hard without being brittle.

EXAMPLE 10

Similar tests were made using emulsions of the several secondary polymers with the original polychloroprene latex in the presence of appropriate addition agents as shown in the Recipe IV. Similar results were obtained although the homogeneity of the dispersion was not always as good from the latex cure as from the mill-mixed cure.

Thus the process of the invention cures or vulcanizes polychloroprene by the chemical combination therewith of an aromatic dinitroso compound to yield a substance in which the molecules are presumably cross-linked by the dinitroso residues resulting from interaction with adjacent polymer chains to produce in the polymer an improved tensile strength, improved elongation, improved resistance to solvents and the like, and superior wearing properties.

While there are above disclosed but a limited number of embodiments of the process and product of the present invention, it is possible to produce still other embodiments without departing from the inventive concept herein disclosed and it is therefore desired that only such limitations be imposed on the appended claims as are stated therein or required by the prior art.

The invention claimed is:

1. The process of curing polychloroprene, comprising the steps in combination of mixing thereinto a portion of dinitroso benzene in the proportion of 0.1% to 10% of the polychloroprene and heating the material to a temperature within the range between 150° and 350° F. for a time interval within the range between 5 minutes and 5 hours.

2. In the processing of a polychloroprene latex the steps in combination of adding to the latex 0.1 to 10 percent per weight of polychloroprene of an aromatic dinitroso hydrocarbon, comprising dinitroso naphthalene, coagulating the latex into a desired form and vulcanizing the formed polychloroprene by heating to a temperature within the range of 150 to 350° F.

3. A composition of matter comprising in combination 100 parts of polychloroprene and 0.5 to 10% of para-dinitroso benzene based on the amount of polychloroprene.

4. A composition of matter comprising in combination 100 parts of polychloroprene and 0.1 to 10 parts of an aromatic dinitroso hydrocarbon selected from the group consisting of dinitrosobenzene, dinitrosocymene, and dinitrosonaphthalene.

5. The process of vulcanizing polychloroprene which comprises incorporating in said polychloroprene from 0.5 to 2 parts of paradinitrosobenzene per 100 parts of polychloroprene and subjecting the polychloroprene to vulcanizing conditions.

6. The process of curing polychloroprene comprising mixing therewith in the proportion of 0.1% to 10% of the polychloroprene a dinitroso aromatic hydrocarbon from the group consisting of meta and para dinitroso substituted aromatic hydrocarbons, and heating the resulting mixture to a temperature within the range of 150 to 350° F. for a vulcanizing time.

7. Process according to claim 6 in which the vulcanizing of the polychloroprene is effected in the presence of 1 to 5 parts by weight of zinc oxide per 100 parts of the polychloroprene.

8. A composition comprising in combination 100 parts by weight of polychloroprene and 0.1 to 10 parts by weight of a dinitroso aromatic hydrocarbon consisting of an aromatic hydrocarbon nucleus having two nitroso groups attached thereto.

JOHN REHNER, JR.
PAUL J. FLORY.

REFERENCES CITED

The following references are of record in the file of this patent:

UNITED STATES PATENTS

| Number | Name | Date |
|---|---|---|
| 1,249,180 | Ostromislensky | Dec. 4, 1917 |
| 1,289,566 | Somerville | Dec. 31, 1918 |
| 2,170,191 | Fisher | Aug. 22, 1939 |
| 2,393,321 | Haworth | Jan. 22, 1946 |
| 2,419,976 | Trepagnier et al. | May 6, 1947 |

OTHER REFERENCES

Industrial and Eng. Chem., vol. 38, No. 5, pp. 500–506, May 1946.

Beilstein's Handbuch der Organische Chemie; 4th edition, vol. 7, page 628 (1925).